UNITED STATES PATENT OFFICE.

9603X

JOHN FARLEE, OF MERCER COUNTY, KENTUCKY.

IMPROVEMENT IN PLOWS.

Specification forming part of Letters Patent dated April 21, 1836.

*To all whom it may concern:*

Be it known that I, JOHN FARLEE, of Mercer county, and State of Kentucky, have invented a new and useful Improvement in Plows; and I do hereby declare that the following is a full and exact description thereof.

This plow differs from all others now in use, both in the wood-work and in the iron-work, and excels them as well in the simplicity of the workmanship as in strength, utility, and durability. The wood-work consists of three principal pieces—the beam and the handles. The beam is not mortised into the handle, as is usual, but fastened by an iron staple. The handles are straight, except a slight curve at the top, for the convenience of the grasp, made by splitting the ends, bending them, and then riveting them with iron rivets. The handles are connected by three rounds and an iron rod on the top of the upper round. The iron consists (exclusive of tops and screws designed to fasten the iron and wood work together) of three principal parts—the share, the mold-board, and the rod. The rod and share do not differ from the share in ordinary plows, except the wing does not extend so far back. Nor do I claim any improvement in its form; but the form of the mold-board which I claim as my own invention, and not previously known in the above machine, can be best described by a reference to the model, and by pointing out the parts in which it differs from the mold-boards now in use on other plows.

First. It extends from the share to the beam, thereby dispensing with the necessity of one iron rod, and the helve or knee, which is a piece of timber extending from the share to the beam and mortised into it, which weakens the beam somewhat. This is one of the improvements which I claim as resulting from my invention.

Second. The mold-board is thickened and rounded where it touches the beam, called the "neck" of the mold-board, with a hole through it through which the iron rod passes, so that one rod passing through the share, board, and beam binds all firmly together and prevents any violent strain from falling on any of the parts.

Third. It renders it unnecessary to have this board as thick and heavy as other cast-iron mold-boards.

Fourth. It does not rise so perpendicularly from the share to the beam as other mold-boards, but is curved and bends toward the heel of the plow, thereby making the sod or dirt as it is split and moved by the board press upon the heel of the plow or preventing it from running on the point.

Fifth. It is raised more from the ground at the wing, owing to its form and the curve of the share, thereby permitting the loose dirt to fall in the furrow, and preventing the plow from clogging.

Sixth. It is not so much bent as the mold-board of other plows, but enough to turn the sod entirely over, and thereby permitting the handle to which it is fastened to be made, except at the grasp, which is another improvement in the wood-work which I claim as my own invention, not before known in the above-described machine.

A common two-horse plow should be made in the following proportions: The beam five feet six inches long, four and one-half inches wide, three and one-half inches thick where the rod passes through it, decreasing somewhat toward both ends, which point should be about fifteen inches from the handle. The beam should be nearly straight on the lower edge, and about thirteen inches perpendicular from the ground at the heel of the plow and about seventeen inches at the clevis, and the handles about four feet four inches long, two feet apart at the top and six inches at the bottom, of the usual size. The share should be about twenty inches from heel to point, with a wing fourteen and one-half inches long and eleven and one-half wide. The mold-board for such a plow should weigh about twenty-five pounds and all the iron about fifty. It should measure from the neck at the beam to the point in the share fifteen inches, from the point in the share to the foot of the handle fourteen and one-half inches, from the foot of the handle to the top of the mold-board thirteen, from that point or corner to the neck nineteen inches, and diagonally from corner to corner one way about twenty-five inches, the other fifteen. These plans may be made larger or smaller for one horse or more, to suit the convenience of the farmer, and with the mold-board on the left or right hand. The mold-board is fastened to the share by the rod and one or two tops and screws, one near the bar, the other at the edges of the wing; and the clevis-pin is so constructed as to unscrew any and all of the tops, which will appear by the model.

The mold-board of the above form is what I claim as my own invention and not previously known in the above-described machine. It should be made of cast-iron, as witness my hand this 18th day of March, 1836.

JOHN FARLEE.

Witnesses:
A. F. SMITH,
JOHN L. SMIDLEY.